May 27, 1969
B. E. SHLESINGER, JR
3,447,108
MAGNETIC SWITCHING MECHANISM AND METHOD OF
MANUFACTURE AND OPERATION UTILIZING
INJECTION MOLDING TECHNIQUES
Filed Feb. 15, 1968
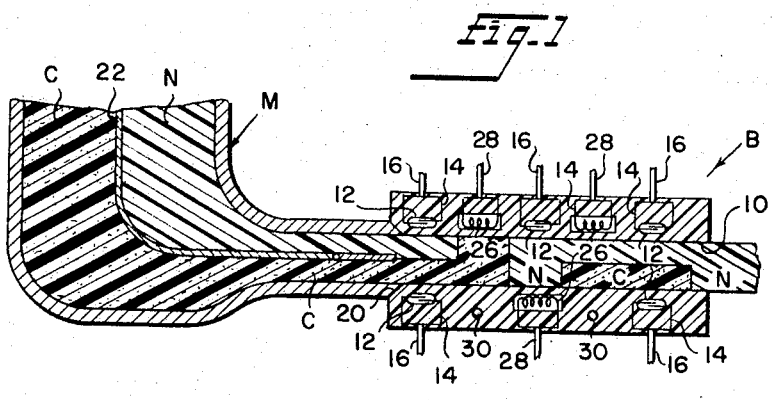
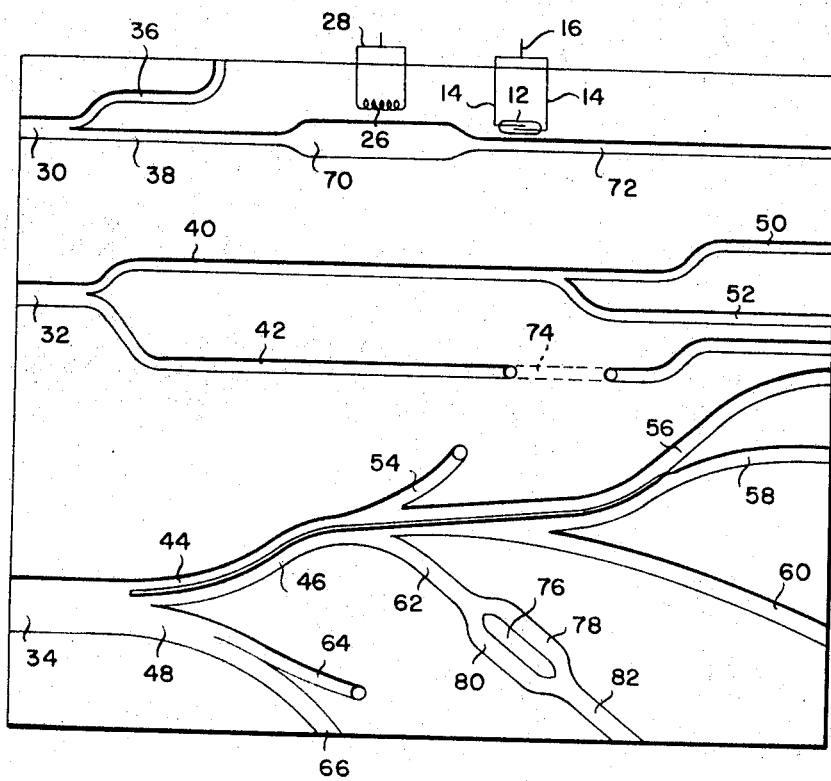
INVENTOR
Bernard Edward Shlesinger Jr.

United States Patent Office 3,447,108
Patented May 27, 1969

3,447,108
MAGNETIC SWITCHING MECHANISM AND METHOD OF MANUFACTURE AND OPERATION UTILIZING INJECTION MOLDING TECHNIQUES
Bernard Edward Shlesinger, Jr., 3906 Bruce Lane, Annandale, Va. 22003
Continuation-in-part of application Ser. No. 580,059, Sept. 16, 1966, now Patent No. 3,391,261. This application Feb. 15, 1968, Ser. No. 705,759
Int. Cl. H01h 9/54
U.S. Cl. 335—205     14 Claims

ABSTRACT OF THE DISCLOSURE

An electrical switching method or the like for operating electrical circuit means comprising: injecting in a programmed period of time a controlled and metered amount of flowable magnetic plastic material into a block along a predetermined path having magnetic field sensitive circuit operating means associated therewith; injecting in a programmed period of time a controlled and metered amount of flowable non-magnetic plastic material into said block along said predetermined path so as to form an interface with said magnetic material; moving said materials through said block and past said circuit operating means by controlled pressure means; thereby to operate said electrical circuit means for a predetermined period of time.

---

This application is a continuation-in-part of my U.S. application Ser. No. 580,059 filed Sept. 16, 1966, now Patent No. 3,391,261.

This invention relates to program switches and the like, their construction, method of operation, and method of manufacture involving the injection of a magnetic plastic material into a switch block for the purpose of causing the switch to operate in a programmed sequence. It is somewhat similar to my U.S. Patent 3,193,630 issued July 6, 1965 and to my U.S. Patent No. 3,354,434 issued Nov. 21, 1967. It is also analogous to my U.S. application Ser. No. 478,588 filed Aug. 10, 1965 and co-pending herewith.

*Historical background objects and summary*

Prior art program switches have been limited by being complex, difficult to repair and not easily adaptable for different types of equipment and jobs. Because of the amount of hardware generally involved, block switches are generally quite complex and expensive and if there are a great many circuits involved, difficult to change over.

It is an object of this invention to provide a switch block for programming systems which is inexpensive to manufacture and so reasonable as to cost that it can be thrown away when no longer of use.

Yet another object of this invention is to provide a magnetic switch programming system which is easily adaptable to various types of equipment and tasks.

A further object of this invention is to provide a programming switch system which is fast, trouble free, and interchangeable.

Another object of this invention is to provide a magnetic switch programming system for use in computing and the like.

Still a further object of this invention is to provide a programming system which can be selectively changed without disassembly.

Yet a further object of this invention is to provide a programming system which can be used with simple magnetic reed switching devices or complex magnetic switching arrangements.

Another object of this invention is to provide a programming system which is capable of being repetitive, or discontinuous as desired.

It is a further object of this invention to incorporate the use of plastic materials having both magnetic and non-magnetic properties.

Another object of this invention is to provide an electrical switch block which utilizes magnetic sensing devices which have no moving parts subject to wear or erosion.

Another object of this invention is to provide an electrical switch block which may be programmed to a certain sequence and subsequently reprogrammed to a different sequence by the use of injection molding techniques.

Still another object of this invention is to provide a pre-assembled block which may be readily available on the job for immediate connection to an injection molding machine which will inject desired programmed information on the job.

A further object of this invention is to eliminate the need for expensive materials by substituting inexpeensive plastic materials therefor.

In summary, this invention relates not only to a method for electrical switching, but also to a method of manufacturing a switch block and the pre-assembly block used in the manufacture of the switch block. The invention utilizes the principle of injection molding by injecting into certain cavities in the switch block pre-selected amounts of magnetic and non magnetic plastic serially so as to bring certain portions of the magnetic and non-magnetc material beneath the reed switches or the like or the magnetic sensors in order to selectively operate certain of the switches for a programmed period of time because of the metering and control of the injection materials being used.

These and other objects and advantages of this invention will be apparent from the following description and claims.

In the accompanying drawings which illustrate by way of example various embodiments of this invention:

FIGURE 1 is a fragmentary cross-sectional view showing the injection molding apparatus connected to the switch block;

FIGURE 2 is a top plan view broken away illustrating somewhat schematically various embodiments of this invention.

FIGURE 1

For the purpose of clarity, in the drawings, B indicates the switch block. The injector molding machine is generally indicated by M. The magnetic plastic material is generally by C and the non-magnetic material is indicated by N.

In FIGURE 1, the block B includes an opening therein 10 which may be of any desired shape and configuration as will subsequently be obvious. Supported by the block B are a series of magnetic switching devices such as reed switches 12. The reed switches 12 are encapsuled and may be mounted just behind the wall of the through channel or opening 10. The reed switches 12 are connected to the surface of the block B by conductors 14 which may be connected to printed circuits on the surface of the block B (not shown) or to leads 16 or the like.

In the injection molding machine M the nozzle 18 is connected to the block B as at 20. The injection molding machine includes a divider 22 which separates two charges; one of the magnetic material as indicated by C and the other of the non-magnetic material as indicated by N. A pivoted valve member 24 permits extrusion of both or either of thet materials C and N.

It will be obvious that the switches 12 or the detecting devices 26 may be positioned within the channel or associated with the block as required. For the purpose of this invention, the plastic supplied to the injection molding machine M may be of the thermoplastic or thermosetting variety as desired.

Any plastic material available may be utilized and a number of magnetic plastics are presently on the market and available for the purposes of this invention.

*Operation*

In operation, the plastic material is injected under pressure in metered amounts into the block B in a programmed sequence of magnetic C and non-magnetic N units of material as illustrated. If it is intended for the material to be injected into the block for purpose of permanent setting up therein, the injection will continue until the material just emerges from the block B. If a continuous programming switching system is to be used, continuous injection of the material from the end of the block B will result in a pile up of the material. The material may be recovered and subsequently used for other purposes or possibly reclaimed for utilization of all of the magnetic material by adding additional magnetic filler to bring the percentage of magnetic filler in the total amount of plastic into proper balance. If the blocks B are to be utilized for a long period of time, it may be preferable to use a thermosetting type composition. If it is intended that the blocks B be subsequently refilled by some other type program, then, it might be more desirable to inject a thermoplastic composition which can be readily forced out by application of pressure or by application of heat as by means of the heating elements 30 or by means of a solvent or the like.

The pressure of injection may be varied to increase the speed of flow or decrease the speed of flow in the block B for purposes of continuously changing the circuitry. The length of the charge for example, the conductive material injected, will effect the period of time of operation of a particular circuit where continuous injection is used. The amount of material may be controlled by the valve 24 and the valve may be pivoted so as to permit the non-magnetic material to be injected when the valve 24 is down and the magnetic material to be injected when the valve is up. In the horizontal position, the valve 24 permits injection of both magnetic and non-magnetic materials. This will allow for operation of switches 12 or detectors 26 at the top of the block or at the bottom of the block independently of each other as desired. In the case of ejecting the material as aforementioned, air or a second charge or the like may be used. The air may be injected at various places in the block as desired. The block B may be constructed of a non-conductive material and where plastic is used, it should be of a type unaffected by high temperature particularly in the case where heat is used to cause the material to flow more rapidly through the block.

FIGURE 2

FIGURE 2 illustrates a board having various configurations and intricate designs for controlling the flow of injected material and for setting up different types of combinations and switching mechanisms as desired. Any number of main channels 30, 32 and 34 can be provided having branches 36, 38, 40, 42, 44, 46, and 48 provided with tributaries 50, 52, 54, 56, 58, 60, 62, 64, and 66. Branch 38 may be provided with a widened portion as at 70 which subsequently narrows as at 72.

Branch 42 may be provided with an area 74 which goes off transversely to the main plane of the board B.

The tributary 62 may be provided with a divider member 76 which divides the tributary 62 into streams 78 and 80 which subsequently converge to form a single stream 82.

It will be obvious that locating the switches 12 and the sensors 26 in various positions in the block B will provide considerable flexibility of programming and by proper design of the channels etc., additional programming systems can be worked out.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. An electrical switching method or the like for operating electrical circuit means comprising:
   (a) injecting in a programmed period of time a controlled and metered amount of flowable magnetic plastic material into a block along a predetermined path having magnetic field sensitive circuit operating means associated therewith.
   (b) injecting in a programmed period of time a controlled and metered amount of flowable non-magnetic plastic material into said block along said predetermined path so as to form an interface with said magnetic material.
   (c) moving said materials through said block and past said circuit operating means by controlled pressure means.
   (d) thereby to operate said electrical circuit means for a predetermined period of time.

2. An electrical switching method or the like as in claim 1 and including:
   (a) ejecting said controlled amount of materials from said block after operation of said electrical circuit means 3. An electrical switching method as in claim 1 and including:
   (a) injecting simultaneously into said block both magnetic and non-magnetic materials so as to form stratified layers transversely disposed in said predetermined path.

4. An electrical switching method or the like as in claim 1 and including:
   (a) injecting said magnetic and non-magnetic materials into said block so that portions along said path are stratified transversely thereof and other portions are stratified longitudinally.

5. An electrical switching method, or the like as in claim 1 and including:
   (a) varying the controlled pressure means in a programmed period of time to increase or decrease the speed of flow of said materials through said block.

6. An electrical switching method or the like as in claim 5 and wherein:
   (a) the amount of controlled magnetic material injected is less than the amount of non-magnetic material.

7. An electrical switching method or the like as in claim 5 and wherein:
   (a) the amount of controlled magnetic material injected is more than the amount of non-magnetic material.

8. An electrical switching method or the like as in claim 1 and wherein:
   (a) said amounts of flowable magnetic and non-magnetic materials are subsequently divided and directed into additional paths having second magnetic field sensitive circuit operating means associated therewith and past said second magnetic field sensitive circuit operating means, (b) thereby to operate additional electrical circuit means.

9. An electrical switching method or the like as in claim 8 and wherein:
   (a) said divided materials are subsequently reassembled into a single path having third magnetic field sensitive circuit operating means therein and moved past said third magnetic field sensitive circuit operating means;
   (b) thereby to operate still additional electrical circuit means.

10. An electrical switching method or the like as in claim 1 and including:
   (a) injecting in a programmed period of time said magnetic materials simultaneously into a plurality of separate paths in said block each having magnetic field sensitive circuit operating means associated therewith and moving said materials past said means;
   (b) thereby to operate simultaneously a plurality of electrical circuit means.

11. An electrical switching method as in claim 8 and including:
   (a) subdividing said divided materials and directing the subdivided materials into further additional paths having third magnetic field sensitive circuit operating means associated therewith and moving the subdivided materials past said third magnetic field sensitive circuit operating means;
   (b) thereby to operate still additional electrical circuit means.

12. An electrical switching method as in claim 1 and including:
   (a) slowing down the speed of movement of said materials in certain areas of said block as compared with other areas.

13. An electrical switching method as in claim 1 and including:
   (a) increasing the speed of movement of said materials in certain areas of said block as compared with other areas.

14. An electrical switching method as in claim 1 and including:
   (a) applying heat to said block to increase the speed of flow of said materials.

References Cited

UNITED STATES PATENTS

| | | | |
|---|---|---|---|
| 2,687,500 | 8/1954 | Jones et al. | 335—243 |
| 2,917,599 | 12/1959 | Ovshinsky | 335—1 |
| 3,261,941 | 7/1966 | Shlesinger | 335—205 |

BERNARD A. GILHEANY, *Primary Examiner.*

R. N. ENVALL, JR., *Assistant Examiner.*

U.S. Cl. X.R.

200—46